United States Patent [19]

Ueda et al.

[11] 4,340,798
[45] Jul. 20, 1982

[54] VOICE-CONTROLLED SAFETY ARRANGEMENT HEATING APPARATUS

[75] Inventors: Shigeki Ueda, Kitakatsuragi; Teruhisa Takano, Osaka, both of Japan

[73] Assignee: Matsushita Electric Industrial Co., Ltd., Kadoma, Japan

[21] Appl. No.: 217,653

[22] Filed: Dec. 18, 1980

[30] Foreign Application Priority Data

Dec. 21, 1979 [JP] Japan .................. 54/167406

[51] Int. Cl.³ .............................................. H05B 6/68
[52] U.S. Cl. .................... 219/10.55 B; 179/1 VC; 219/10.55 R
[58] Field of Search ............ 219/10.55 E, 10.55 B, 219/10.55 M, 10.55 R; 179/1 VC

[56] References Cited

U.S. PATENT DOCUMENTS

| 3,286,031 | 11/1966 | Geddes | 179/1 VC |
| 3,944,736 | 3/1976 | Shepard | 179/1 VC |
| 3,998,045 | 12/1976 | Lester . | |
| 4,016,540 | 4/1977 | Hyatt . | |
| 4,158,759 | 6/1979 | Mason | 219/10.55 B |
| 4,190,756 | 2/1980 | Foerstner . | |

FOREIGN PATENT DOCUMENTS 2373117 8/1978 France .................. 179/1 VC

OTHER PUBLICATIONS

Walker, G. M., *LSI Controls Gaining in Home Appliances*, Electronics, vol. 50, No. 8, 4-14-77, pp. 91-99.

*Primary Examiner*—Arthur T. Grimley
*Attorney, Agent, or Firm*—Cushman, Darby & Cushman

[57] ABSTRACT

A heating apparatus capable of receiving several voice commands which comprises a voice recognition circuit and is improved from a systematic point of view, so that erroneous recognition in receiving a starting command and a stop command is effectively prevented, and the heating apparatus further comprises a stop button to produce an input signal which is given priority over any input voice commands and which fulfills an equivalent function to the stop command thereby enabling of stopping a heating operation by pushing the stop button, even when the voice recognition circuit does not correctly work or a voice command can not be acknowledged by the voice recognition circuit due to large acoustical noises coming from the circumference around the heating apparatus.

12 Claims, 14 Drawing Figures

($V_{in}$) 
Time →

FIG. 9 (b)

($V_{BPF}$) 
Time →

FIG. 9 (c)

($V_F$) 
T
Time →

VOICE-CONTROLLED SAFETY ARRANGEMENT HEATING APPARATUS

This application is directed to subject matter that is related to the subject matter of the following co-pending U.S. patent applications: UEDA et al. Ser. No. 217,685, filed Dec. 18, 1980; TAKANO et al, Ser. No. 217,651, filed Dec. 18, 1980 and UEDA et al., Ser. No. 217,684, filed Dec. 18, 1980.

BACKGROUND OF THE INVENTION

1. Field of the Invention

The present invention relates to a heating apparatus, to which an operating command can be given by voices instead of by pushing many switch buttons by hand.

2. Prior Art

In recent years, studies have been made to introduce a control system that can be actuated by voices, letters or words, signs or pictures as an aid or guide for inputting command into an electronics system, in order to attain easier and more natural communication between a user and a system. Especially, the use of a voice as an information transforming medium is attracting much attention as the most natural communication mode between man and machine. The use of voice in controlling an apparatus becomes more and more realizable, as the semiconductor technology advances by providing rapid increases of memory capacity through higher and higher circuit integrations in memory devices, and by an appearance and development of a microcomputers to be used as a controlling devices, etc.

However, the present state of the art in voice recognition techniques can not assure a perfect command recognition, i.e. there still remains a possibility that the user's voice is erroneously recognized. When a voice recognition system of an apparatus will be improved with more sophisticated hard ware in order to avoid erroneous recognition, the size of a control system incorporated into the apparatus becomes larger. This size increase hampers the introduction of a voice recognition system into household electric appliances such as a heating microwave oven type apparatus.

If a voice recognition system is installed in a heating apparatus such as an electric oven or a microwave oven, the most dangerous maloperation is an abnormal starting operation i.e. a heating operation is erroneously started without a heating command. In this case, an enclosure case and/or a door of the heating apparatus is unnecessarily heated and can sometimes be over-heated to a high temperature, thereby exposing the user to a risk of burning of the user's hands. In worst cases, the enclosure case may catch fire, or curtains or others nearby the heating apparatus may be burned by a spreading fire. In the case of microwave ovens, if such an erroneous heating operation be carried out without a heating load therein, then a leak amount of microwave radiation energy through the door might increase and besides elements such as a magnetron might be damaged thereby drastically shortening their life times. Therefore, a control system for the heating apparatus should be designed by giving careful consideration to prevent the abovementioned starting maloperation.

Another maloperation which is dangerous is the occurance of a stop command that is not acknowledged and acted upon by the control system of the heating apparatus and hence the heating operation can not be interrupted at a desired time in the middle of a heating cycle. In the following two situations the user may wish to interrupt the heating operation halfway before it is completed. A first situation is that the user wishes to confirm that how much a foodstuff is being heated, by opening the door in the middle of the heating cycle and testing its temperature. In case the user opens the door when electric power supply to the heating means still continues, he is placed in a dangerous situation. By having to reset a timer every time the door is opened for the sake of safety is troublesome, since a renewed setting is necessary for resuming the heating operation after the door has been opened. In these respects, it is preferable to provide in the heating apparatus an interruption control circuit which interrupts the heating operation for a moment.

A second situation occurs when the user wishes to interrupt the heating either because the foodstuff being heated accidentally catches fire in the heating chamber or because the heating operation was erroneously started without a normal command. Even if the heating apparatus is provided with a door switch which switches off the heating circuit once a door handle is pulled, like the case of conventional microwave ovens, it is still dangerous to open the door in order to stop the electric power supply, once the heating object catches fire inside the heating chamber. This is because oxygen is supplied to the burning object by the opening of the door thereby spreading the fire violently. Therefore, it is preferable to provide in the heating apparatus a stop control circuit which can instantly interrupt the heating operation by stopping electric power supply to the heating means with the door closed. But, even if such a stop control circuit is installed in the heating apparatus, still there may be a possibility that a stop command can not be acknowledged instantly by the stop control circuit and that the heating operation proceeds. This is undesirable and sometimes dangerous for the users. In particular, it is extremely dangerous when the user is upset or at a loss what to do, and he or she can not take necessary steps, such as, for example, pulling out the electrical power plug from the its wall socket.

Therefore, in designing a control system for the heating apparatus, it is essential to pay attention how to prevent the abnormal starting of maloperation and how to overcome the difficulties associated with inputting a command for instant stopping of the heating operation.

SUMMARY OF THE INVENTION

The present invention provides a heating apparatus capable of receiving voice commands so that the user does not need to push many operation buttons. The voice commands include commands for presetting a selected heating sequence for starting a heating operation, for interrupting a heating operation, and for resuming a heating operation after an interruption thereof. The heating operation of the heating apparatus in accordance with the present invention is improved from a systematic point of view so that erroneous recognition in receiving a starting command and a stop command is effectively prevented. In addition, the heating apparatus comprises a stop key (an operation button) on the operation panel. The input signal from the stop key is given priority over any input voice commands, and fulfills an equivalent function to the stop voice command. Thus, it is also possible to stop the heating operation by pushing the stop key, even when a voice recognition circuit does not correctly work or a voice command can be not acknowledged by the voice recognition circuit due to large acoustical noises coming from the area near the heating apparatus.

DESCRIPTION OF THE PREFERRED EMBODIMENTS

A heating apparatus in accordance with the present invention comprises:
- an enclosure case having therein a heating chamber in which a object to be heated is to be placed, the enclosure case having a door at an opening of the heating chamber, and
- a heating means for generating heating energy in the heating chamber,
- wherein the improvement is that the heating apparatus comprises
- a voice command input means for transforming a user's command voice into a command input signal,
- a pattern analyzer for frequency-analyzing the command input signal thereby dividing it into input pattern signals for several predetermined frequency bands, the pattern analyzer being for subsequently sampling the input pattern signals and carring out A/D conversion thereof thereby producing pattern-analyzed digital data,
- an input pattern memory for memorizing the pattern-analyzed digital data in a form of time sequential patterns,
- a reference pattern memory for storing time sequential reference pattern data as reference patterns,
- a recognition processing circuit for comparing the pattern-analyzed digital data memorized in the input pattern memory with the time sequential reference pattern data stored in the reference pattern memory, and for outputting a signal of an affinity degree of the comparison, and
- an output control circuit for issuing a predetermined control signal when the affinity degree determined by the signal from the recognition processing circuit is higher than a predetermined affinity degree,
- the reference pattern memory comprising a first address part which contains reference pattern data corresponding to a first voice command for stopping a heating operation of the heating means, and a second address part which contains another reference pattern data corresponding to a second voice command for starting the heating operation of the heating means, and
- the recognition processing circuit being for proceeding the comparison of the pattern-analyzed digital data with the first reference pattern data corresponding to the first voice command in advance of the comparison with the second reference pattern data corresponding to the second voice command.

The heating apparatus in accordance with the present invention preferably further comprises a stop key on its operation panel. The stop key can be used to manually stop a heating operation of the heating means such as a heater or a magnetron instantly when it is pushed. Such manual stopping becomes useful or effective, when the voice recognition circuit does not correctly work during the heating operation, when a voice command can not be acknowledged by the voice recognition circuit due to too much acoustical noises coming from the area around the heating apparatus, or when the voice recognition circuit cannot recognize an normal tone or accent of the user's voice command.

Figure 1:
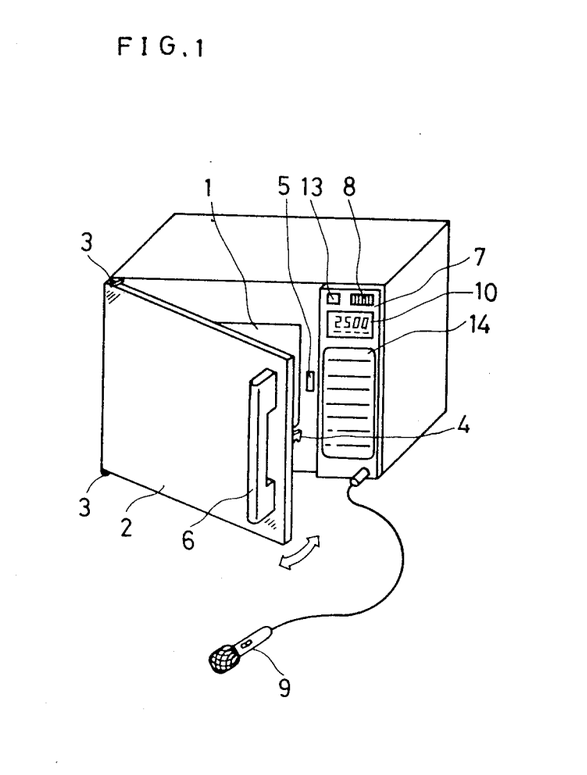
FIG. 1 is a perspective view of a heating apparatus embodying the present invention.
Figure 2:
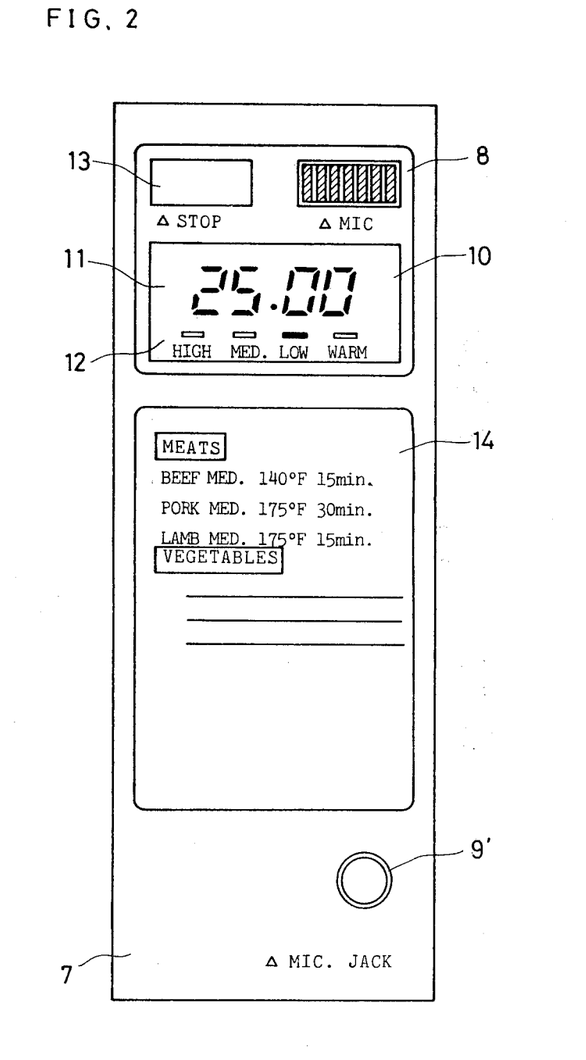
FIG. 2 is a front view showing an operation panel attached to a front wall of the heating apparatus of FIG. 1.

A preferred embodiment embodying the present invention will be described by referring to FIG. 1 and thereafter. FIG. 1 is a perspective view of a heating apparatus embodying the present invention. FIG. 2 is a front view showing an operation panel attached to a front wall of the heating apparatus of FIG. 1. The heating apparatus comprises a heating chamber 1, a door 2 pivotally supported by hinges 3, and an operation panel 7. The door 2 can be closed or opened by a handle 6. The door 2 is provided with a door lock 4 which is received by a socket 5 when the door 2 is closed.

A built-in microphone 8 is disposed at a top part of the operation panel 7. The built-in microphone 8 receives user's voice commands spoken towards it. Instead of the built-in microphone 8, he or she may use a wire-connected hand microphone 9, a connecting plug part thereof being plugged into a microphone jack 9'. By use of the wire-connected hand microphone 9, input voice commands can be well recognized by the heating apparatus even when it is used in a noisy environment.

An indication part (display) 10 includes a numeric indication part 11 and an output indication part 12. The numeric indication part 11 displays four (4) numerals representing a heating time or a heating temperature. The output indication part 12 displays a selected heating power state from among four (4) available power states for the heating. A stop key 13 at the front panel 7 is used to stop the heating operation of the heating apparatus. When the stop key 13 is pushed by the user, an input signal therefrom is given priority over any input voice commands and the heating operation is instantly interrupted. A reference table 14 is attached on the operation panel 7. Several sequential steps, e.g. heating output power, heating temperature and heating time, are listed thereon for reference in cooking a variety of foodstuffs.

Figure 3:
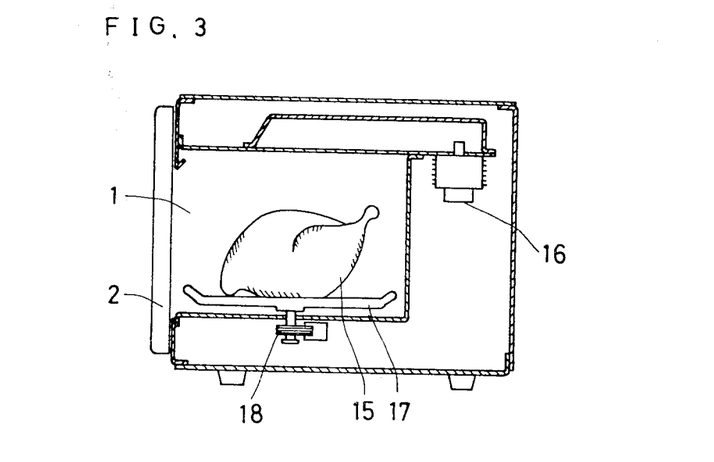
FIG. 3 is a sectional side view of the heating apparatus of FIG. 1.

FIG. 3 is a sectional side view of the heating apparatus of FIG. 1. A object 15 to be heated is placed on a turntable 17 inside the heating chamber 1. A heating source 16, such as a heater or a magnetron supplies heat energy to object 15. In this case, for example, the heating source 16 is a magnetron which radiates microwave radiation inside the heating chamber 1. The turntable 17 can be rotated by a motor 18 during the heating operation in order to obtain uniform heating of the heating object 15.

Figure 4:
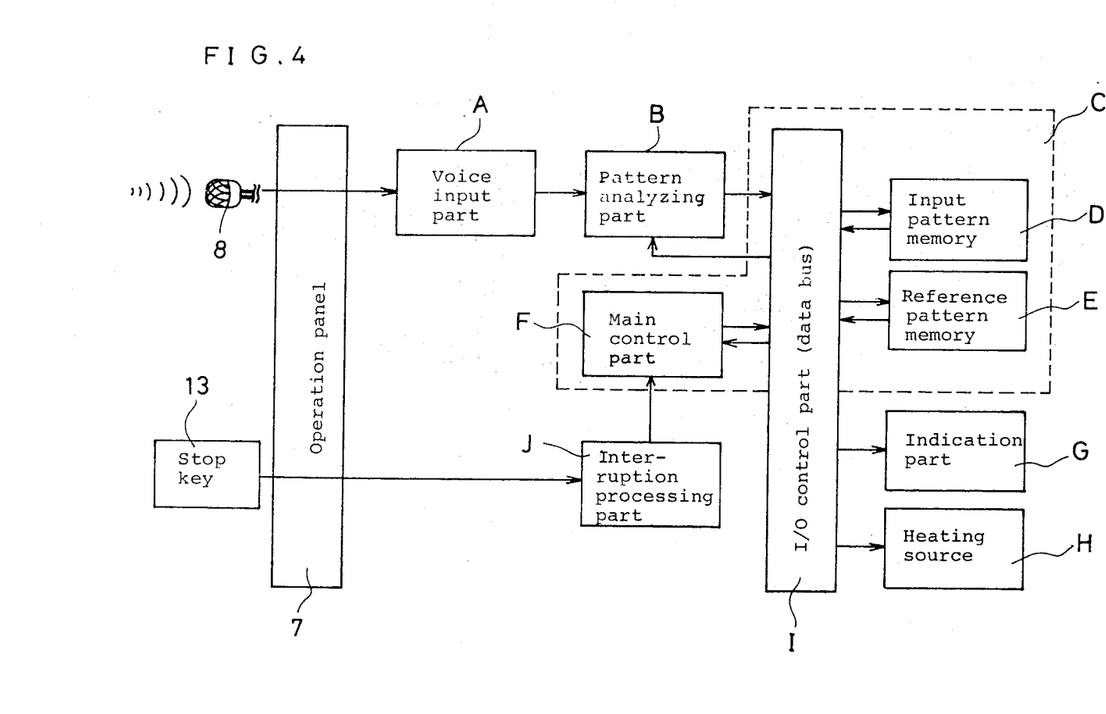
FIG. 4 is a block diagram of a control system.

A control system of the heating apparatus embodying the present invention will be briefly described referring to FIG. 4. FIG. 4 is a block diagram of the control system. The voice recognition is made in principle in the following manner. A command signal by the user's voice from the built-in microphone 8 or the wire-connected hand microphone 9 is fed to a pattern analyzing part B through a voice input part A. The command signal is analyzed with respect to signal frequencies and is sampled for several frequency bands in a voice recognition part C. The sampled data are then stored in an input pattern memory D. Reference pattern data have been obtained in advance by following the similar procedure and already stored in a reference pattern memory E. A main control part F controls data-in operations and data-out operations of the input pattern memory D and the reference pattern memory E.

After the sampled data are stored in the input pattern memory D, they are compared with the reference pattern data in order to specify which voice command was fed in the voice recognition part C. When one input voice command is specified, a corresponding control signal is issued from the main control part F for controlling an indication part G and a heating source H. On the other hand, when the stop key 13 at the operation panel 7 is pushed, an input signal from it is processed in the interruption processing part J. An interruption output signal of the interruption processing part J is fed in the main control part F, and is processed therein. The processing of the interruption output signal is given priority over that of any input voice commands. And pushing of the stop key 13 fulfills an equivalent function to that of the stop voice command.

Figure 5:
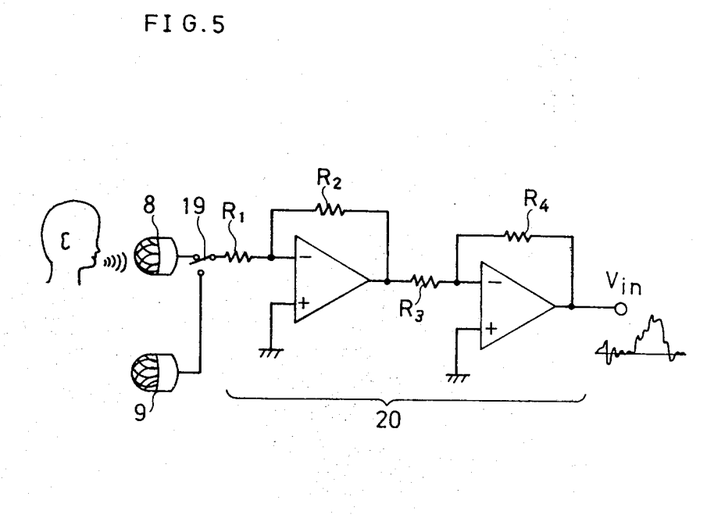
FIG. 5 is a circuit diagram of an example of a voice input stage.

One example of a specific circuit embodiment of the control system will be described in detail in the following. Of course, other circuits could be used to carry out the desired functions. The circuit detailed is merely the best mode known at the time of the filing of the application for this patent. FIG. 5 is a circuit diagram of an example of a voice input stage. Either one of the built-in microphone 8 or the wire-connected hand microphone 9 is used for a voice input means. An input signal corresponding to the voice commands is fed in an amplifier stage 20 through a change-over switch 19. The change-over switch 19 is disposed on the rear side of the microphone jack 9' (in FIG. 2). When the plug of the wire-connected hand microphone 9 is plugged in the microphone jack 9', the moving contact of the change-over switch 19 is thrown to the side of the wire-connected hand microphone 9.

Figure 6:
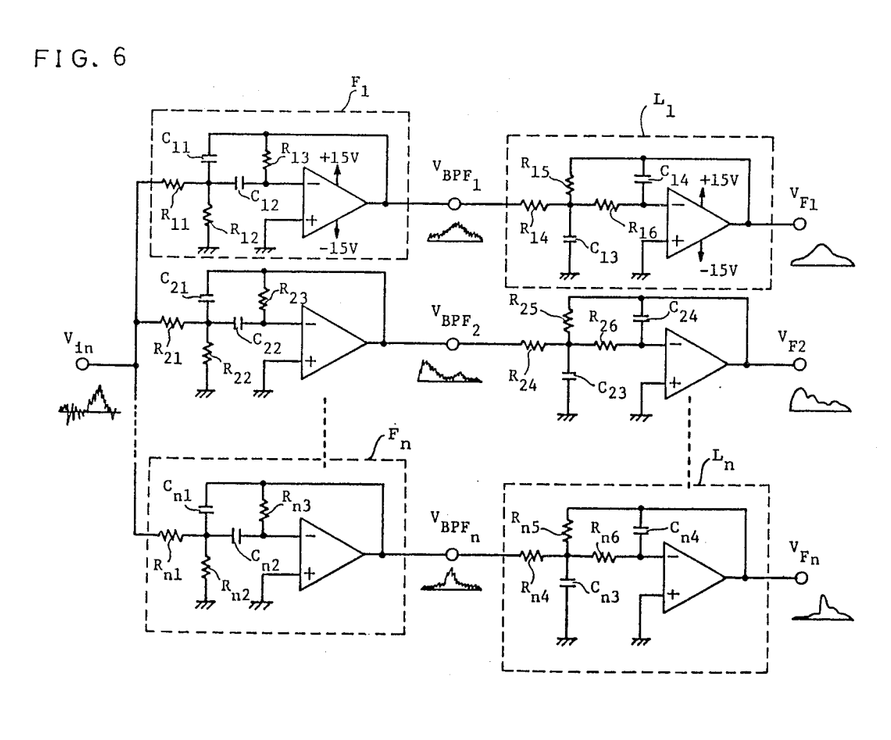
FIG. 6 is a circuit diagram of an example of a filter bank used in the heating apparatus embodying the present invention.
Figure 7:
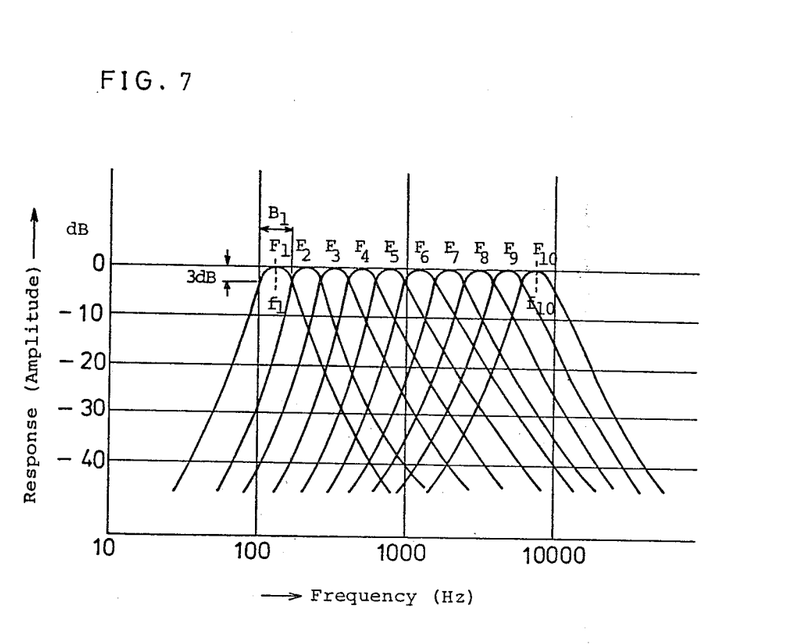
FIG. 7 is a graph showing frequency characteristics of band-pass filters used in the filter bank of FIG. 6.

FIG. 6 is a circuit diagram of an example of a filter bank used in the heating apparatus embodying the present invention. The filter bank comprises multiple feed-back type band-pass filters, $F_1, F_2, \ldots,$ and $F_n$, and multiple feed-back type low-pass filters $L_1, L_2, \ldots,$ and $L_n$. The band-pass filters $F_1$ to $F_n$ have frequency characteristics as shown in FIG. 7. In this example a frequency range of 100 Hz to 10 KHz is covered by ten band-pass filters. The center frequencies $f_j$ and the band width $B_j$ ($j=1, 2, \ldots, 10$) are designed as shown in FIG. 7.

Figure 8:
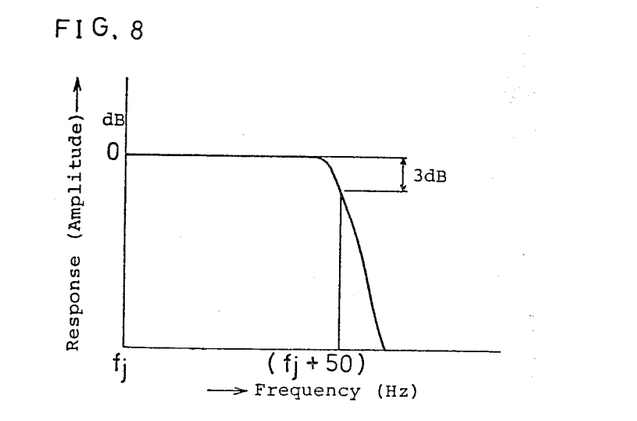
FIG. 8 is a graph showing a frequency characteristic of low-pass filters used in the filter bank of FIG. 6.
Figure 9:
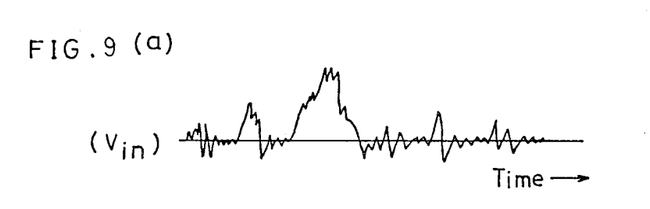
FIGS. 9(a), 9(b) and 9(c) are graphs showing signal waveforms at several parts of the filter bank of FIG. 6.
Figure 10:
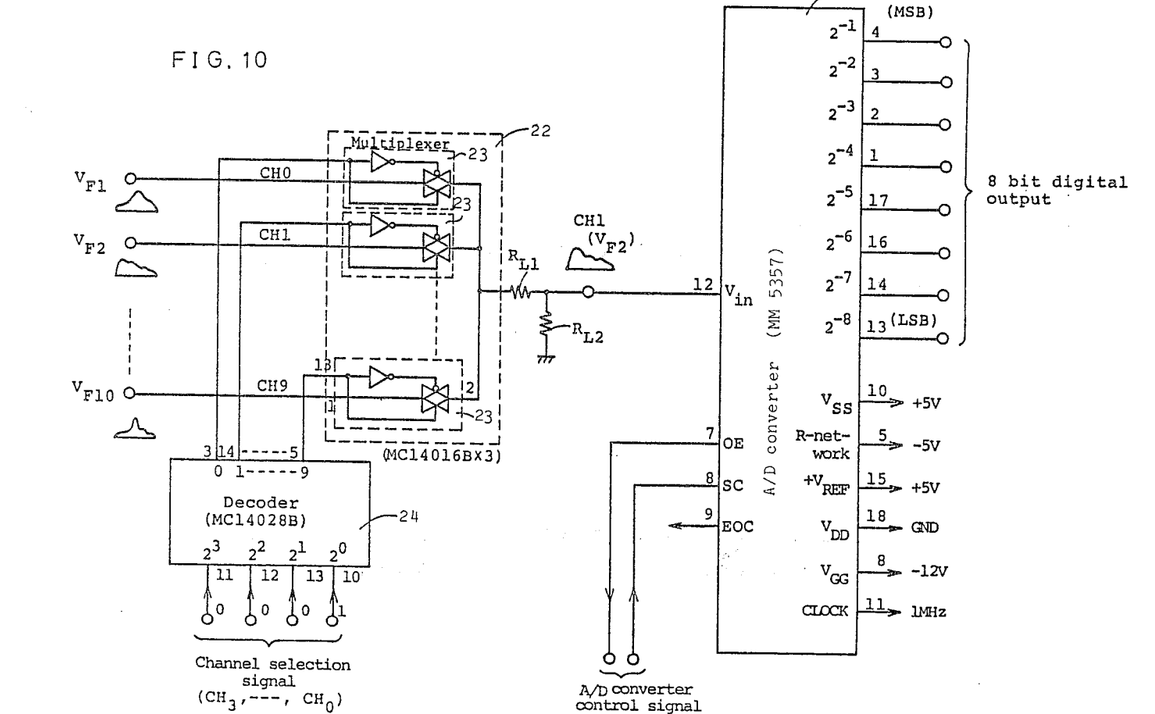
FIG. 10 is a circuit diagram of an analog multiplexer and an A/D converter.

The low-pass filters $L_n$ have the cut-off frequencies as shown in FIG. 8. In the example, all of the low-pass filters $L_n$ are of multiple feed-back type having the cut-off frequencies of 50 Hz. By using such a filter bank, a voice command signal $V_{in}$ is analyzed into waveforms in ten frequency bands. FIG. 9(a) shows a waveform of the voice command signal $V_{in}$, and FIG. 9(b) shows a waveform of an output signal $V_{BPF}$ from one of the band-pass filters $F_1, \ldots,$ and $F_{10}$. As shown in FIG. 9(b), the waveform of the signal $V_{BPF}$ contains pitch (oscillation frequency of the vocal chords) of the user's voice, and therefore, the signal $V_{BPF}$ is passed through the low-pass filter to remove the pitch and obtain a filter bank output $V_F$ of a smoothed envelope waveform as shown by FIG. 9(c). The larger the number of the filters, the better the voice pattern can be analyzed. However, using the many filters renders the apparatus too large, and therefore, a reasonable number of filters for a home-use utensil should be selected by considering a suitable recognition ability and response speed of the control system from both aspects of software and hardware. For the case wherein an 8-bit microprocessor is used for its control part, 10 filters both for the band-pass filters $F_j$ and low-pass filters $L_j$ are empirically found suitable or effective. The output signals of the low-pass filters $L_1, L_2, L_3, \ldots, L_n$ are coupled to an analog multiplexer 22, and then the output of the multiplexer 22 is subjected to sampling by an A/D converter 25. The multiplexer 22 is, as shown in FIG. 10, comprises ten analog switches 23, which comprise, for example, three C-MOS devices such as MC14016B (a four-circuit analog switch) produced by Motorola Inc. Channel switching is operated by a channel selection signal sent from a CPU (central processing unit) in the main control unit. A decoder 24 decodes a 4-bit binary type channel selection signal into a 10-bit channel selection signal to be given to the multiplexer 22. The decoder 24 is structured by using a BCD-to-Decimal Decoder of MC14028B produced by Motorola Inc. For example, when a "0001" signal is input, the decoder 24 outputs a signal for channel 1 (CH1). Accordingly, the signal $V_{F2}$ is sent to the output terminal of the analog multiplexer 22. By switching the channel selection signal in the similar manner, outputs of ten filters of the filter bank are issued in turn at the output terminal of the multiplexer 22.

Then, the output signals of the filter bank are sent to the A/D converter 25 and converted into 8-bit digital signals. The A/D converter 25 comprises, for example a monolithic A/D converter such as the MM 5357 sold by National Semiconductors Inc. By adjusting resistances of load resistors $R_{L1}$ and $R_{L2}$, the analog input signal is adjusted to be within ±5 V. The input terminal SC(8) of the A/D converter 25 receives a start conversion signal, by which the output signals from the filter bank are sampled with a period of between 1 and 10 m sec. With such a period, satisfactory voice recognition by pattern characteristic can be made when the voice waveform is processed as an envelope signal. The input terminal EOC(9) receives an end-of-conversion signal, and the output terminal OE(7) outputs an output-enable (OE) signal having effective timing of the 8-bit digital output signal. The CPU in turn samples the filter bank outputs by means of the SC signal, sweepingly receiving the channel selection signal, and converts them into 8-bit digital data. The abovementioned processing is made by using the OE signal as monitor (in the present embodiment the OE signal is used for interruption).

Figure 11:
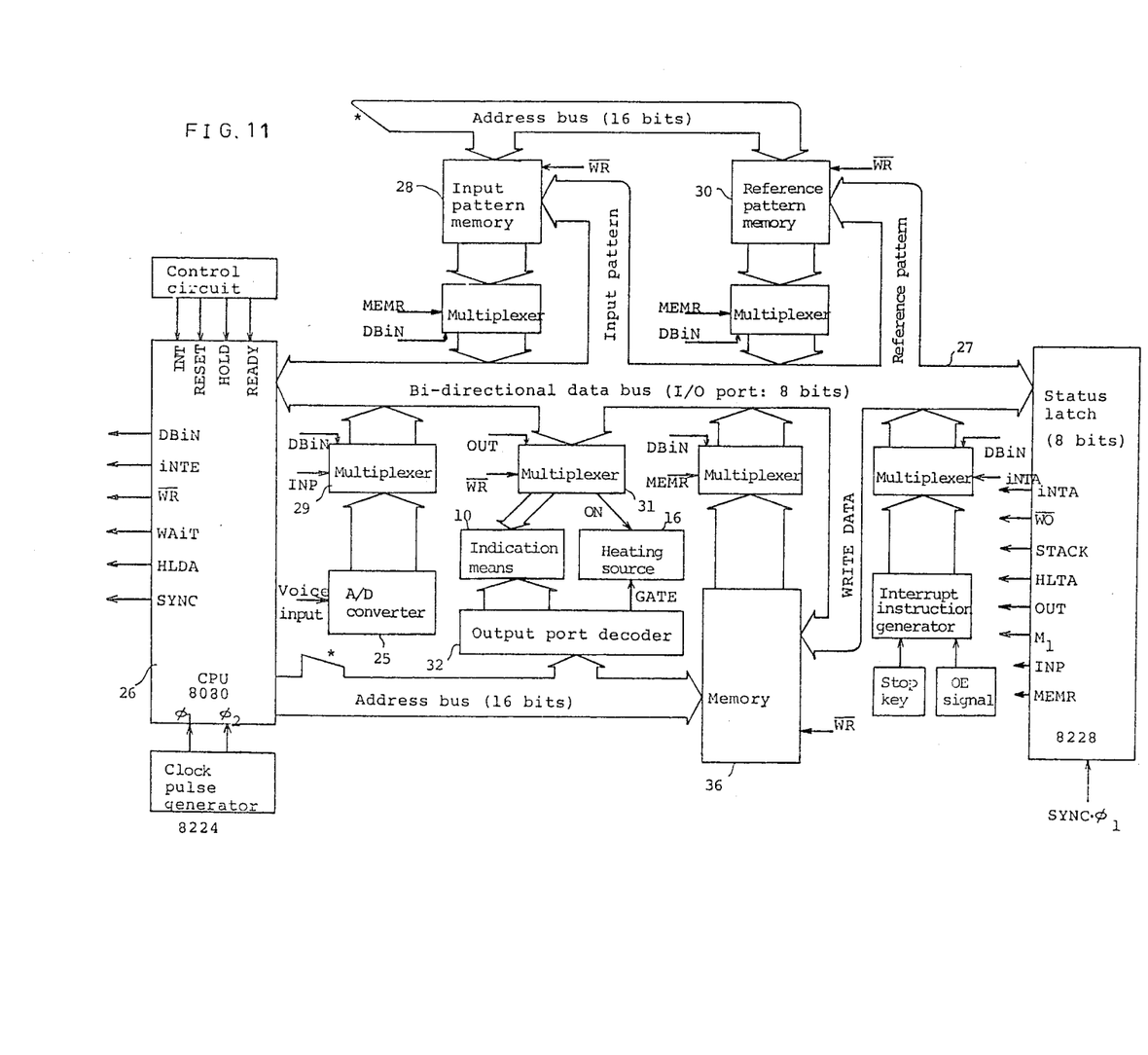
FIG. 11 is a block diagram of a voice recognition and processing system including a CPU (central processing unit) as a main control unit.

FIG. 11 shows a block diagram of one example of a voice recognition and processing system including a CPU as a main control unit. A CPU 26 comprises an 8-bit micro-processor such as, for example, an Intel 8080. The voice data signal (8-bit digital signal) is written into the input pattern memory 28 through the I/O port 27. That is, the 8-bit voice data signal issued from the A/D converter 25 is sent to the I/O port 27 (bi-directional data bus) in a data reading mode under the control of the multiplexer 29. The voice data signal is once written into the input pattern memory 28 by a control signal from the CPU 26. Following such processes, the voice input data are analyzed in every divided frequency band, are sampled by the multiplexer 29 and the A/D converter 25, and then stored in the input pattern memory 28.

Then by detecting the end of the voice input signal, the CPU 26 counts the time length T (FIG. 9(c)) of this voice input pattern, and normalizes this time length by utilizing a known dynamic programming (DP) technique, in which DP process the input voice pattern is compared with the reference pattern registered in the memory 30, and partial expansion or partial compression are carried out until the voice input pattern most coincides with the reference pattern, and a reference pattern with highest affinity with the input pattern is selected.

For more information on the DP technique applied for the voice recognition, reference is made to, for example IEEE Transactions on Acoustics, Speech, and Signal processing, Vol. ASSP-26, No. 1, pp. 43–49, February 1978, and Vol. ASSP-27, No. 6, pp. 588–595, December 1980.

By means of the abovementioned recognition process, the voice input signal is defined as coincided with the selected reference pattern, and therefore, a specified output signal is given to an output control multiplexer 31. Thereby, a heating start signal, a display data signal for the indication part 10, and the aforementioned channel selection signal or sampling signal SC are issued with predetermined timings controlled by an output port decoder 32.

Figure 12:
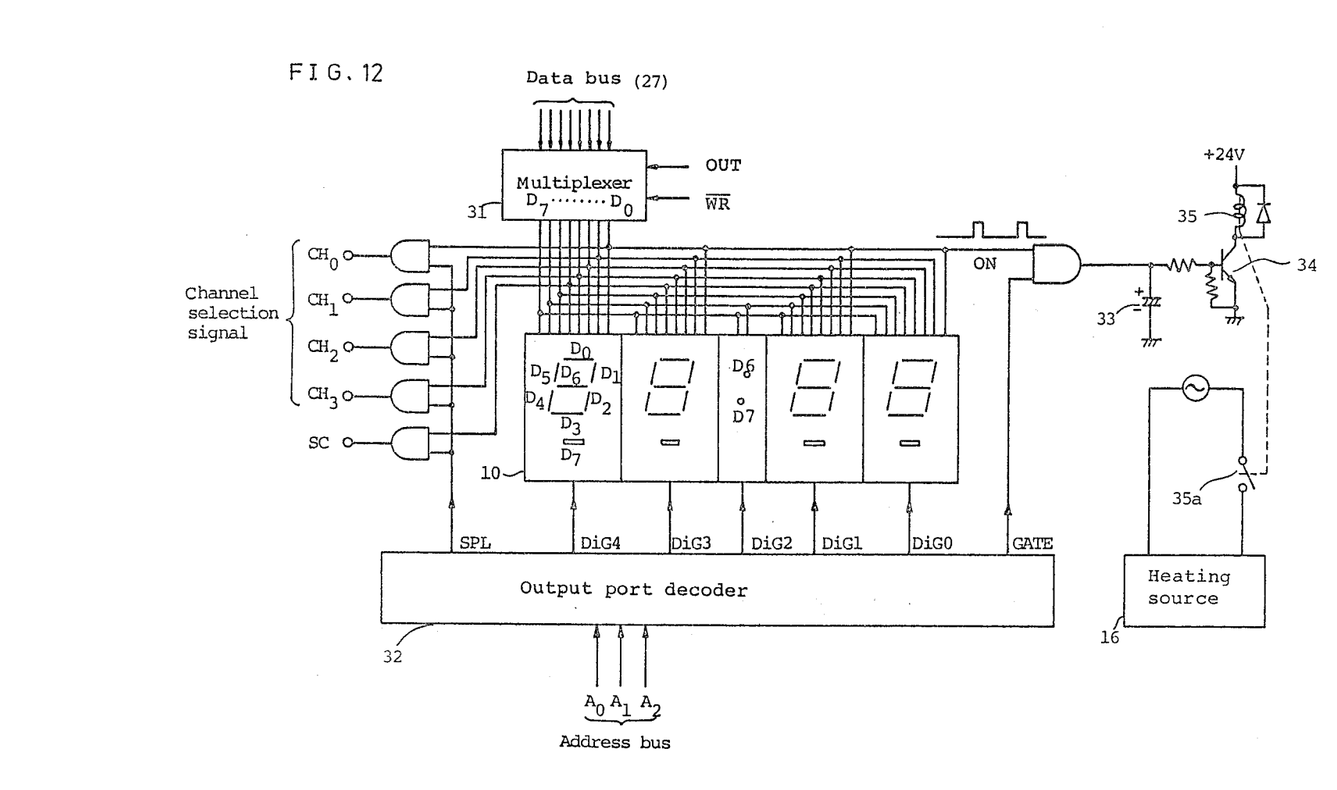
FIG. 12 is a block diagram of an output control circuit.

FIG. 12 is a block diagram of an output control circuit. The output port decoder 32 causes the output signal from the bi-directional data bus 27 through a multiplexer 31 to be selected and to be given to the channel selection signal, the display means 10 and the heating source 16, respectively.

The heating starting signal ON is generated as a pulse, but is smoothed by a capacitor 33, and then turns a transistor 34 on and energizes a relay 35. By the energization of the relay 35, the contact 35a of the relay 35 closes and electric energy is fed to the heating source 16. Upon a termination of the heating time or by manual pushing of the stop key 13, the signal ON changes to "L" level, and the contact 35a of the relay 35 opens, and thus feeding of the electric energy to the heating source 16 is terminated or interrupted. The display means 10 is dynamic-driven by the signals $DiG_4$ to $DiG_0$. The signals $CH_3$ to $CH_0$ are the channel selection signals, and control the decoder 24 as mentioned above. The signal SC is a sampling pulse of the A/D converter 25.

The structure of the memory area will be explained below referring to a memory area map in FIG. 13. A program memory 36 in FIG. 11 stores control program and data for the CPU 26 in allotted addresses of HEX(-hexadecimal) "0000" to HEX"EFFF". Memory data are actually stored as large as necessary within the area. A read and write memory such as a core memory or an IC memory is used for the memory 36. When a ROM (read only memory) is used for the control program memory per se and a RAM (random access memory) for the data memory, the memory system becomes compact and inexpensive.

Figure 13:
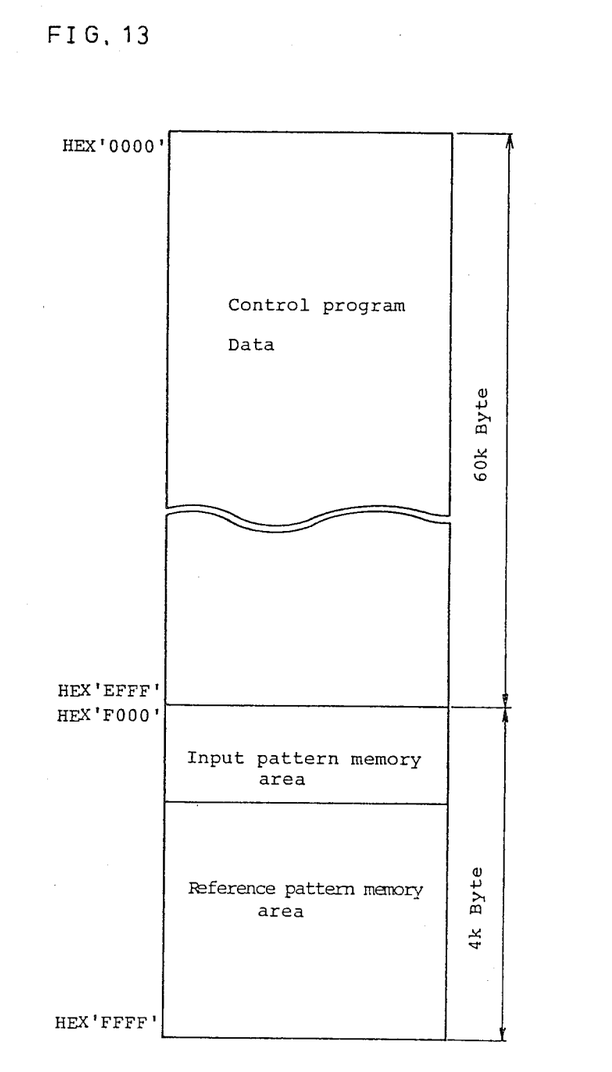
FIG. 13 is a memory map showing a memory address area.

As shown in FIG. 13, addresses of HEX"F000" to HEX"FFFF" are allotted for the input pattern memory 28 and the reference pattern memory 30. The input pattern memory 28 can be embodied by using a read and write memory, a RAM, while the reference pattern memory 30 can be embodied by use of a RAM in case voice command data of one of several limited users are preliminarily stored in the RAM 30 in order to easily obtain recognition of the user's voice with the stored reference pattern. However, in order to recognize a voice command of an unlimited number of potential users, a standard reference voice pattern data has to be stored in the reference pattern memory 30 consisting of a ROM.

Figure 14:
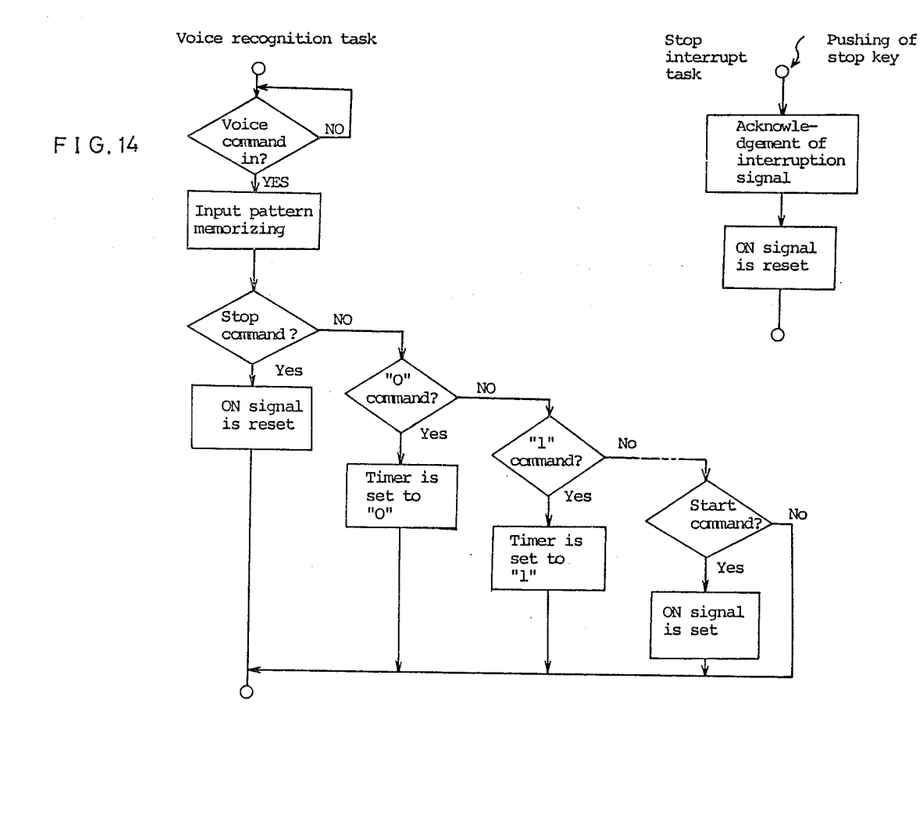
FIG. 14 is a program flow chart for a control program used for the heating apparatus embodying the present invention.

Brief description is given for the control program data stored in the memory 36. FIG. 14 is a program flow chart showing main parts of the control program. Once the input voice pattern data are stored in the input pattern memory 28, they are successively compared with the reference pattern data already stored in the reference pattern memory 30. The comparison process is made in such a manner that the input voice pattern data are firstly compared with the reference pattern data corresponding to the stop voice command, that thereafter they are compared with other data, for example, code names for the heating menu and numerical commands "0", "1", etc. corresponding to heating time setting, and that the input voice pattern data are lastly compared with the reference pattern data corresponding to the start voice command.

Since the voice recognition process for the start voice command is carried out last, the most dangerous maloperation arising from erroneous starting recognition is not likely to occur, even when acoustic noises other than the user's command voices are received by the microphone. In addition, since the voice recognition process for the stop voice command is carried out first, another dangerous maloperation against stopping which may arise from erroneous recognition can be prevented. Such a maloperation against stopping is dangerous when the heating operation can not be interrupted even if the user's stop command is given to the microphone. The interruption signal from the stop key is given priority over other voice command signals in the recognition process thereby assuring safety during the heating operation of the heating apparatus embodying the present invention.

The interruption signal from the stop key is used for the interruption signal for the CPU in the abovementioned embodiment. It is also practical to link the stop key to a stop switch to be used for turning off the transistor 34. Such a stop switch can be inserted at the base of the transistor 34 for turning it off irrespective of the ON signal, or can be connected to the relay 35 in series.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A heating apparatus comprising:
    an enclosure case having therein a heating chamber adapted to receive an object to be heated, said enclosure case having a door at an opening thereof,
    a heating means for generating heating energy in said heating chamber,
    a voice command input means for transforming a user's voice command into a command input signal,
    a pattern analyzer for frequency-analyzing said command input signal by deriving therefrom input pattern signals for a predetermined number of frequency bands, subsequently sampling said input pattern signals, and carrying out A/D conversion thereof thereby producing pattern-analyzed digital data,
    an input pattern memory for storing said pattern-analyzed digital data in a form of time sequential patterns,
    a reference pattern memory for storing time sequential reference pattern data as reference patterns,
    a recognition processing circuit for comparing said pattern-analyzed digital data stored in said input pattern memory with said time sequential reference pattern data stored in said reference pattern memory, and for outputting a signal indicative of an affinity degree of the comparison, and
    an output control circuit for issuing a predetermined control signal when said affinity degree determined by said signal from said recognition processing circuit is higher than a predetermined affinity degree,
    said reference pattern memory comprising a first address part which contains first reference pattern data corresponding to a first voice command for stopping a heating operation of said heating means, and a second address part which contains second reference pattern data corresponding to a second voice command for starting said heating operation of said heating means,
    said recognition processing circuit being constituted to carry out the comparison of said pattern-analyzed digital data with said first reference pattern data corresponding to said first voice command, in advance of the comparison of said pattern-analyzed digital data with said second reference pattern data corresponding to said second voice command.

2. A heating apparatus in accordance with claim 1 further comprising a stop key on an operation panel on said enclosure case for manually stopping said heating operation of said heating means irrespective of voice commands from said voice command input means.

3. A heating apparatus in accordance with claim 1 or 2, wherein said reference pattern memory is a random access memory.

4. A heating apparatus in accordance with claim 3, wherein said time sequential reference pattern data have been previously produced from said pattern-analyzed digital data and stored in said reference pattern memory in advance of the recognition process by said recognition processing circuit.

5. A heating apparatus in accordance with claim 1 or 2, wherein said reference pattern memory is a read only memory.

6. A heating apparatus in accordance with claim 5, wherein said time sequential reference pattern data have been previously pattern-formed therein in advance of the recognition process by said recognition processing circuit.

7. In a heating apparatus, comprising an enclosure case having therein a heating chamber adapted to receive an object to be heated, said enclosure case having a door at an opening thereof, a heating means for generating heating energy in said heating chamber; a voice command input means for transforming a user's voice command into a command input signal; and a voice command circuit, the improvement wherein said voice command circuit comprises:
    a pattern analyzer for frequency-analyzing said command input signal by dividing it into pattern signals for a predetermined number of frequency bands, subsequently sampling said input pattern signals, and carrying out A/D conversion thereof to produce pattern-analyzed digital data,
    an input pattern memory for storing said pattern-analyzed digital data in a form of time sequential patterns,
    a reference pattern memory for storing time sequential reference pattern data as reference patterns,
    a recognition processing circuit for comparing said pattern-analyzed digital data stored in said input pattern memory with said time sequential reference pattern data stored in said reference pattern memory, and for outputting a signal indicative of an affinity degree of the comparison, and
    an output control circuit for issuing a predetermined control signal when said affinity degree determined by said signal from said recognition processing circuit is higher than a predetermined affinity degree,
    said reference pattern memory comprising a first address part which contains first reference pattern data corresponding to a first voice command for stopping a heating operation of said heating means, and a second address part which contains second reference pattern data corresponding to a second voice command for starting said heating operation of said heating means,
    said recognition processing circuit being constituted to carry out the comparison of said pattern-analyzed digital data with said first reference pattern data corresponding to said first voice command, in advance of the comparison of said pattern-analyzed digital data with said second reference pattern data corresponding to said second voice command.

8. An improvement according to claim 7 further comprising a stop key on an operation panel on said enclosure case for manually stopping said heating operation of said heating means irrespective of voice commands from said voice command input means.

9. An improvement according to claim 7 or 8, wherein said reference pattern memory is a random access memroy (RAM).

10. An improvement according to claim 9, wherein said time sequential reference pattern data have been previously produced from said pattern-analyzed digital data and stored in said reference pattern memory in advance of the recognition process by said recognition processing circuit.

11. An improvement according to claim 7 or 8, wherein said reference pattern memory comprises a read only memory (ROM).

12. An improvement according to claim 11, wherein said time sequential reference pattern data have been previously pattern-formed therein in advance of the recognition process by said recognition processing circuit.

* * * * *